(12) United States Patent
Haruki et al.

(10) Patent No.: US 10,915,623 B2
(45) Date of Patent: Feb. 9, 2021

(54) INFORMATION PROCESSING APPARATUS, INFORMATION PROCESSING METHOD, AND COMPUTER PROGRAM PRODUCT

(71) Applicant: Kabushiki Kaisha Toshiba, Minato-ku (JP)

(72) Inventors: Hiroyoshi Haruki, Kawasaki (JP); Masanobu Koike, Tama (JP); Shinya Takumi, Kawasaki (JP); Naoki Ogura, Yokohama (JP); Yoshikazu Hanatani, Komae (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 113 days.

(21) Appl. No.: 15/907,347

(22) Filed: Feb. 28, 2018

(65) Prior Publication Data
US 2019/0073471 A1    Mar. 7, 2019

(30) Foreign Application Priority Data

Sep. 4, 2017    (JP) ................................. 2017-169831

(51) Int. Cl.
*G06F 21/50*    (2013.01)
*G06F 21/44*    (2013.01)
*G06F 21/53*    (2013.01)
*G06F 21/51*    (2013.01)

(52) U.S. Cl.
CPC .............. *G06F 21/50* (2013.01); *G06F 21/44* (2013.01); *G06F 21/51* (2013.01); *G06F 21/53* (2013.01); *G06F 2221/033* (2013.01)

(58) Field of Classification Search
CPC .......... G06F 21/44; G06F 21/50; G06F 21/51; G06F 21/30; G06F 21/52; G06F 21/53
See application file for complete search history.

(56) References Cited

U.S. PATENT DOCUMENTS

| | | | |
|---|---|---|---|
| 6,694,434 B1* | 2/2004 | McGee | G06F 21/565 713/182 |
| 7,865,947 B2 | 1/2011 | Fanton et al. | |
| 8,769,685 B1* | 7/2014 | Conrad | G06F 21/562 726/23 |
| 8,950,007 B1 | 2/2015 | Teal et al. | |
| 9,842,203 B2 | 12/2017 | Fanton et al. | |
| 2004/0019832 A1* | 1/2004 | Arnold | G06F 21/51 714/38.14 |

(Continued)

FOREIGN PATENT DOCUMENTS

| | | |
|---|---|---|
| JP | 2008-165632 A | 7/2008 |
| JP | 2009-259160 | 11/2009 |

(Continued)

*Primary Examiner* — Khang Do
(74) *Attorney, Agent, or Firm* — Oblon, McClelland, Maier & Neustadt, L.L.P.

(57) ABSTRACT

According to an embodiment, an information processing apparatus includes processing circuitry. The processing circuitry is configured to detect writing on a first file and register, in a restriction target storage, file information on the first file and perform, when processing on a second file is requested and file information on the second file coincides with the file information stored in the restriction target storage, first restriction to restrict the processing on the second file.

3 Claims, 5 Drawing Sheets

(56) References Cited

U.S. PATENT DOCUMENTS

| | | | |
|---|---|---|---|
| 2005/0149726 A1* | 7/2005 | Joshi | G06F 21/51 |
| | | | 713/164 |
| 2006/0059469 A1* | 3/2006 | Schumacher | G06F 21/51 |
| | | | 717/127 |
| 2006/0150246 A1 | 7/2006 | Kamada et al. | |
| 2007/0028291 A1* | 2/2007 | Brennan | H04L 63/20 |
| | | | 726/1 |
| 2009/0083852 A1* | 3/2009 | Kuo | G06F 21/564 |
| | | | 726/22 |
| 2011/0167260 A1 | 7/2011 | Fanton et al. | |
| 2013/0055369 A1* | 2/2013 | Kumar | H04L 9/3247 |
| | | | 726/7 |
| 2015/0193618 A1* | 7/2015 | Takano | G06F 21/554 |
| | | | 726/23 |
| 2015/0256552 A1* | 9/2015 | Lee | G06F 21/554 |
| | | | 726/24 |
| 2016/0371490 A1* | 12/2016 | Shakarian | G06N 99/00 |
| 2017/0249459 A1* | 8/2017 | Permeh | G06F 21/54 |
| 2017/0329968 A1* | 11/2017 | Wachdorf | G06F 21/566 |
| 2017/0346843 A1* | 11/2017 | Zhang | G06F 21/44 |
| 2018/0082047 A1* | 3/2018 | Mayo | H04L 9/0643 |
| 2018/0341755 A1* | 11/2018 | Aschauer | G06F 21/52 |
| 2019/0065735 A1 | 2/2019 | Ogura et al. | |
| 2019/0080059 A1 | 3/2019 | Takumi et al. | |
| 2019/0080080 A1 | 3/2019 | Ogura et al. | |

FOREIGN PATENT DOCUMENTS

| | | |
|---|---|---|
| JP | 2011/257960 A | 12/2011 |
| JP | 2014-048866 | 3/2014 |
| JP | 2014-096142 A | 5/2014 |
| JP | 2019-40256 A | 3/2019 |
| JP | 2019-49877 A | 3/2019 |
| JP | 2019-50507 A | 3/2019 |

\* cited by examiner

INFORMATION PROCESSING APPARATUS, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2017-169831, filed on Sep. 4, 2017; the entire contents of which are incorporated herein by reference.

FIELD

Embodiments described herein relate generally to an information processing apparatus, an information processing method, and a computer program product.

BACKGROUND

An information processing apparatus includes a computer system with a processor circuit, a memory, and the like as basic hardware, and executes an application program on an operation system (OS) controlling hardware, for example, thus achieving various functions in accordance with uses. Generally, an application program is installed into an information processing apparatus in a form of an execution file, and its execution is started by user's operation, for example. The information processing apparatus is not limited to an apparatus implemented as a single apparatus, and may be composed of a plurality of computer systems cooperating with each other.

When an unexpected computer program is executed, the information processing apparatus may exhibit unintended behavior or may be damaged seriously. Thus, it is demanded that the information processing apparatus has a mechanism of restricting, when the start of execution of an unexpected computer program is requested, execution of the computer program. From such a viewpoint, there have been proposed techniques of detecting computer program falsification when the execution of a computer program is started and stopping execution of the computer program, and of executing only computer programs permitted in advance. However, there has been demanded a mechanism of restricting processing on files such as an unexpected computer program more efficiently.

DETAILED DESCRIPTION

According to an embodiment, an information processing apparatus includes processing circuitry. The processing circuitry is configured to detect writing on a first file and register, in a restriction target storage, file information on the first file and perform, when processing on a second file is requested and file information on the second file coincides with the file information stored in the restriction target storage, first restriction to restrict the processing of the second file.

Embodiments will be described below in detail with reference to the accompanying drawings. In the following, only functions related to the embodiments will be illustrated and described among various functions of an information processing apparatus according to the embodiments. However, the functions of the information processing apparatus are not limited to ones described below. Moreover, in the following description, the components having the same function will be represented with the same symbols, and the overlapped description will be omitted appropriately.

First Embodiment

Figure 1:
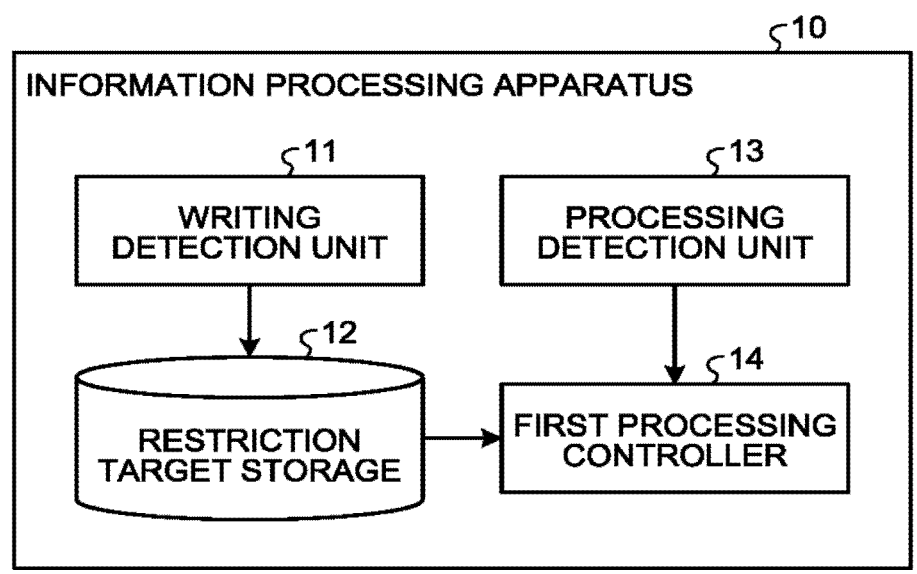
FIG. 1 is a block diagram illustrating a functional configuration example of an information processing apparatus according to a first embodiment.

FIG. 1 is a block diagram illustrating a functional configuration example of an information processing apparatus 10 according to the first embodiment. The information processing apparatus 10 of the first embodiment includes a writing detection unit 11, a restriction target storage 12, a processing detection unit 13, and a first processing controller 14, as illustrated in FIG. 1, for example.

The writing detection unit 11 detects writing on a file, and registers, in the restriction target storage 12, file information on the file written (newly added or altered) by the writing. The file information includes a file path indicating a path to access the file, and the like, for example. The file information registered in the restriction target storage 12 may be any information specifying the file, and there may be used the combination of an inode number and a device number, for example.

The restriction target storage 12 stores file information on files that are targets on which processing is restricted by the first processing controller 14 described later. The files indicated by the file information are files on which writing has been detected by the writing detection unit 11. In the first embodiment, the file written by writing is a target for restriction.

Figure 2:
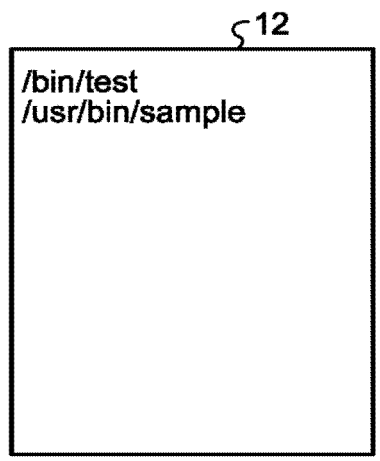
FIG. 2 is a diagram illustrating an example of file information stored in a restriction target storage.

FIG. 2 is a diagram illustrating an example of file information stored in the restriction target storage 12. For example, when writing on a file indicated by the file path "/usr/bin/sample" occurs by operation of new creation of the file or a copy of a file in the state where the file path "/bin/test" (one example of file information) is registered in the restriction target storage 12, the writing detection unit 11 detects the writing and registers "/usr/bin/sample" in the restriction target storage 12. FIG. 2 illustrates file information stored in the restriction target storage 12 after such writing occurs. As illustrated in FIG. 2, for example, every time a file on which processing is to be restricted is detected, that is, every time writing is detected by the writing detection unit 11, the restriction target storage 12 can store the file information on the file to be restricted in a list format.

The processing detection unit 13 detects a request for starting processing on a file, and transfers the file information on the file to the first processing controller 14. For example, when the request for starting processing on a file is a request for starting execution of a computer program, the processing detection unit 13 detects explicit operation by a user or a call from another program, thus detecting the request for starting execution of the computer program.

Once the first processing controller 14 receives the file information from the processing detection unit 13, the first processing controller 14 checks whether the file information received from the processing detection unit 13 coincides with the file information stored in the restriction target storage 12. Then, when the file information received from the processing detection unit 13 is stored in the restriction target storage 12, the first processing controller 14 restricts processing on the file indicated by the file information. For example, a file path of a computer program for which a request for starting execution is detected by the processing detection unit 13 is stored in the restriction target storage 12, the first processing controller 14 makes a control so that the execution of the computer program is not started. Although the restriction of processing is the not starting of execution of the computer program (program is not to be executed) here as an example, the embodiment is not limited thereto. When a file to be restricted is a computer program, for example, the execution may be permitted with restriction, that is, the computer program may be permitted only in given environments such as on a debugger program, on a given virtual machine, or in a sandbox.

Figure 3:
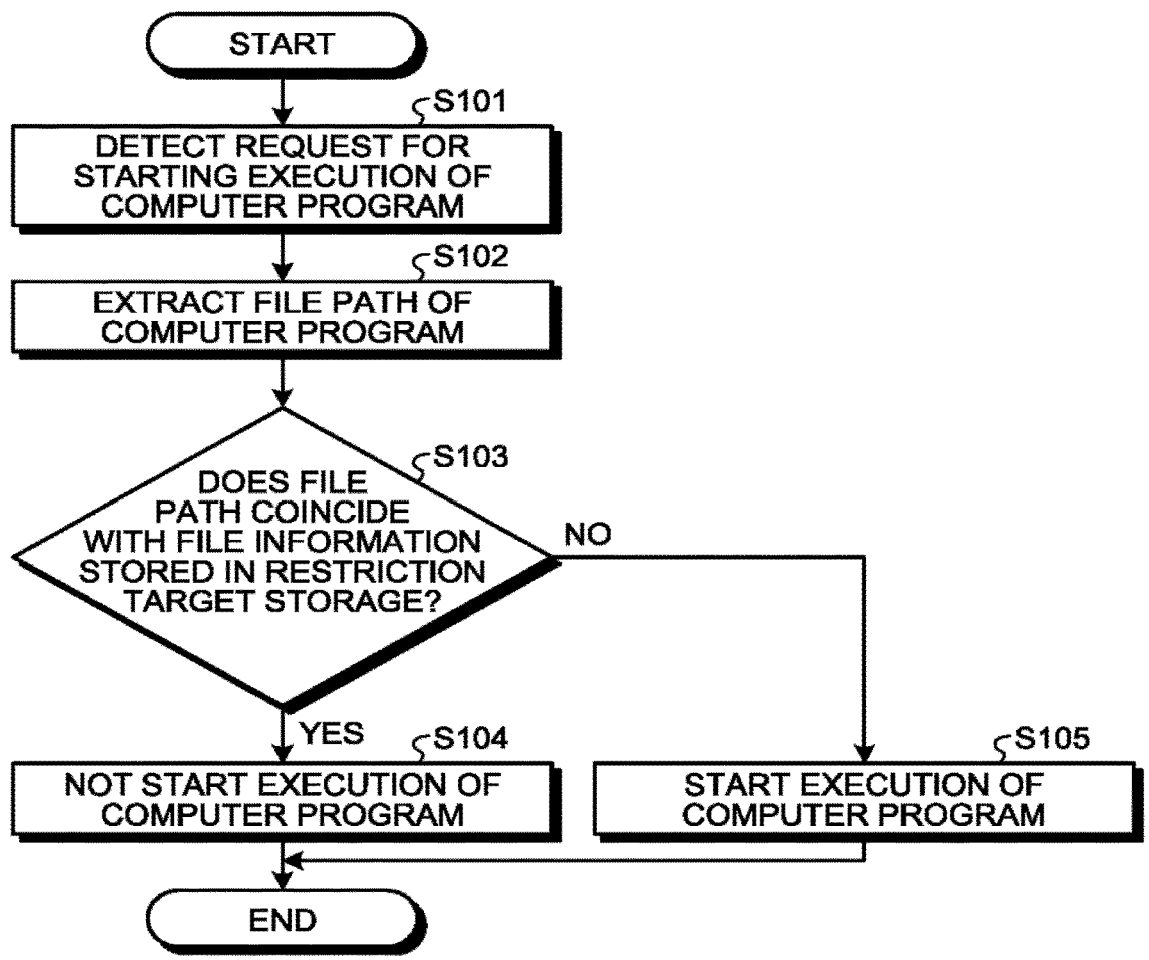
FIG. 3 is a flowchart for explaining an operation example of the information processing apparatus according to the first embodiment.

FIG. 3 is a flowchart for explaining an operation example of the information processing apparatus 10 of the first embodiment. The flowchart of FIG. 3 illustrates a processing procedure from the detection of a request for starting execution of a computer program to the control of execution of the computer program, and it is assumed that the file information on a file on which writing has been detected by the writing detection unit 11 is registered in the restriction target storage 12 before the processing illustrated in the flowchart of FIG. 3 is performed.

Once the start of execution of a computer program is requested by explicit operation by a user, a call from another program, or the like, for example, the processing detection unit 13 detects the request for starting execution of the computer program (Step S101). Then, the processing detection unit 13 extracts a file path (one example of file information) of the computer program for which the start of execution is requested (Step S102), and transfers the file path to the first processing controller 14.

Next, the first processing controller 14 checks whether the file path received from the processing detection unit 13 coincides with the file information stored in the restriction target storage 12 (Step S103). Then, when the file path coincides with the file information stored in the restriction target storage 12 (Yes at Step S103), the first processing controller 14 makes a control so that the execution of the computer program is not started (Step S104). In contrast, when the file path does not coincide with the file information stored in the restriction target storage 12 (No at Step S103), the first processing controller 14 makes a control so that the execution of the computer program is started (Step S105).

Here, assuming that the file information exemplified in FIG. 2 is stored in the restriction target storage 12, there will be further described the operation of the information processing apparatus 10 of the first embodiment when the start of execution of the computer program is requested, while exemplifying concrete examples.

For example, when the start of execution of the computer program "ls" is requested, the processing detection unit 13 detects the request for starting execution of the computer program. Then, the processing detection unit 13 extracts the file path "/bin/ls" of the computer program "ls", and transfers the file path to the first processing controller 14. The first processing controller 14 checks whether the file path "/bin/ls" received from the processing detection unit 13 coincides with the file information stored in the restriction target storage 12 that is exemplified in FIG. 2. In this example, the file path received from the processing detection unit 13 does not coincide with the file information stored in the restriction target storage 12. Thus, the first processing controller 14 makes a control so that the execution of the computer program "ls" is started.

As another example, when the start of execution of the computer program "/usr/bin/sample" is requested, the processing detection unit 13 detects the request for starting execution of the computer program. Then, the processing detection unit 13 extracts the file path "/usr/bin/sample" of the computer program, and transfers the file path to the first processing controller 14. The first processing controller 14 checks whether the file path "/usr/bin/sample" received from the processing detection unit 13 coincides with the file information stored in the restriction target storage 12 that is exemplified in FIG. 2. In this example, the file path received from the processing detection unit 13 coincides with the file information stored in the restriction target storage 12. Thus, the first processing controller 14 makes a control so that the execution of the computer program "/usr/bin/sample" is not started. That is, the information processing apparatus 10 of the first embodiment can control the execution of computer programs for which the start of execution has been requested, such that the execution of the non-written computer program "ls" is started and the execution of the written computer program "/usr/bin/sample" is not started.

As described above with the concrete examples, the information processing apparatus 10 of the first embodiment registers, in the restriction target storage 12, file information on a written file, and when processing on a file is requested, such as a request for starting execution of a computer program, the information processing apparatus 10 restricts processing on the file if the file information on the file coincides with the file information stored in the restriction target storage 12. Therefore, the information processing apparatus 10 of the embodiment can efficiently restrict processing on a file such as an unexpected computer program and effectively prevent the information processing apparatus 10 from exhibiting unintended behavior or being damaged seriously.

A whitelist technique is known as one of the technique of restricting execution of unexpected computer programs. The whitelist technique is a method in which a whitelist including file paths and hash values thereof is created in advance and, in the start of execution of a computer program, the execution of the computer program is permitted only when a hash value of the computer program coincides with a hash value stored in the whitelist. Moreover, there is also proposed a safer method in which signature verification or the like is also performed, in addition to the hash values of the computer program. However, the whitelist technique needs creation of a whitelist including information on computer programs for which the execution is permitted, in advance. In addition, the whitelist technique needs a large processing due to signature verification, hash value calculation, and the like in the start of execution of the computer program. In contrast to this, the information processing apparatus 10 of the first embodiment adopts the method of detecting writing on a file and restricting processing on a written file. Thus, it is unnecessary to perform processing of whitelist creation, signature verification, hash value calculation, and the like, that is required when the whitelist technique is used. Therefore, it is possible to restrict processing on files such as unexpected computer programs more efficiently than the case in which the whitelist technique is used.

First Modification

The above has described the example in which a request for starting execution of a computer program is detected, and the execution of the computer program is restricted when the file information stored in the restriction target storage 12 includes a file path of the computer program for which the start of execution is requested. However, the information processing apparatus 10 of the first embodiment can restrict not only the start of execution of a computer program but also various processing on a file in the same manner. For example, the processing detection unit 13 may detect a request for reading a file, and may make a control, when the restriction target storage 12 stores the file information on the file for which reading is requested, such that the first processing controller 14 does not read in the file.

Second Embodiment

Next, the second embodiment will be described. In the second embodiment, the function corresponding to a file update is added to the above-described first embodiment. That is, in the above-described first embodiment, the processing on a written file is restricted, and thus the processing on a file written by update is also subjected to restriction. Therefore, in the second embodiment, the validity of a file is verified, and then the file information on a file determined to be valid is deleted from the restriction target storage 12, thus preventing restriction on processing on the file updated rightly.

Figure 4:
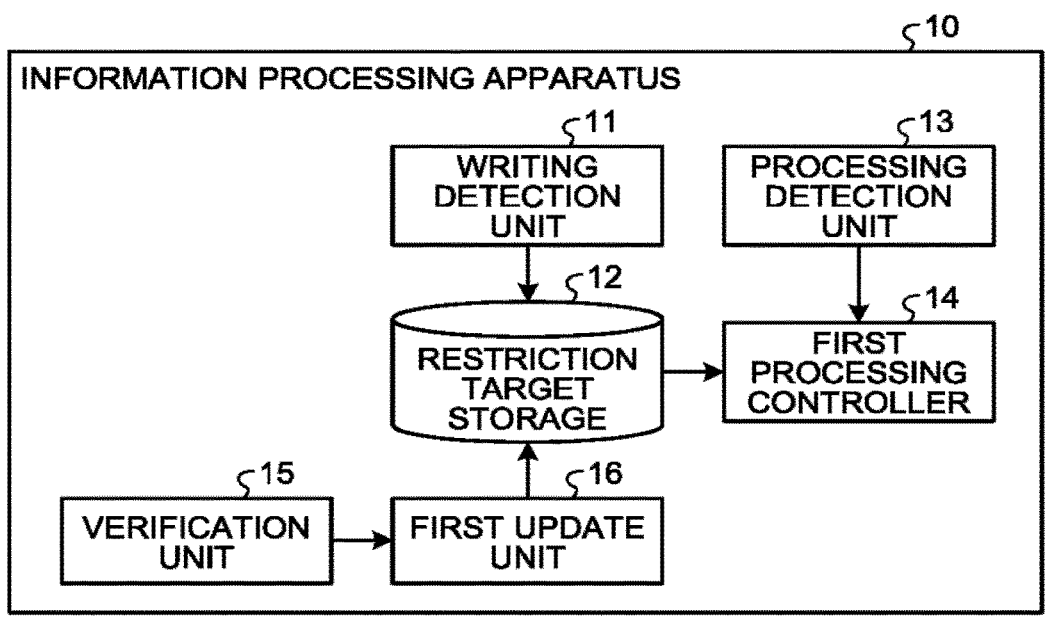
FIG. 4 is a block diagram illustrating a functional configuration example of an information processing apparatus according to a second embodiment.

FIG. 4 is a block diagram illustrating a functional configuration example of the information processing apparatus 10 according to the second embodiment. As illustrated in FIG. 4, the information processing apparatus 10 of the second embodiment further includes a verification unit 15 and a first update unit 16, in addition to the components of the above-described first embodiment (see FIG. 1).

The verification unit 15 verifies whether a file is valid. As a concrete example of the verification method by the verification unit 15 when the file is a computer program, there is known a verification method using a whitelist technique. In this method, the file path and hash values thereof are calculated in the start of execution of a computer program, and the execution is permitted when they are included in the whitelist, while the execution is prohibited when they are not included in the whitelist. The verification unit 15 may verify the validity of a file by another method different from the verification method using the whitelist technique, as long as the validity of the file is verified.

The first update unit 16 detects completion of verification by the verification unit 15, extracts a verification result, and deletes, when the verification unit 15 determines that the file is valid, the file information from the restriction target storage 12. For example, the first update unit 16 extracts a file path of a computer program of which the validity has been verified by the verification unit 15 and a verification result indicating whether the computer program is valid every time the verification unit 15 performs verification. Then, when the verification result indicates that the computer program is valid, the first update unit 16 deletes the file path from the restriction target storage 12.

Figure 5:
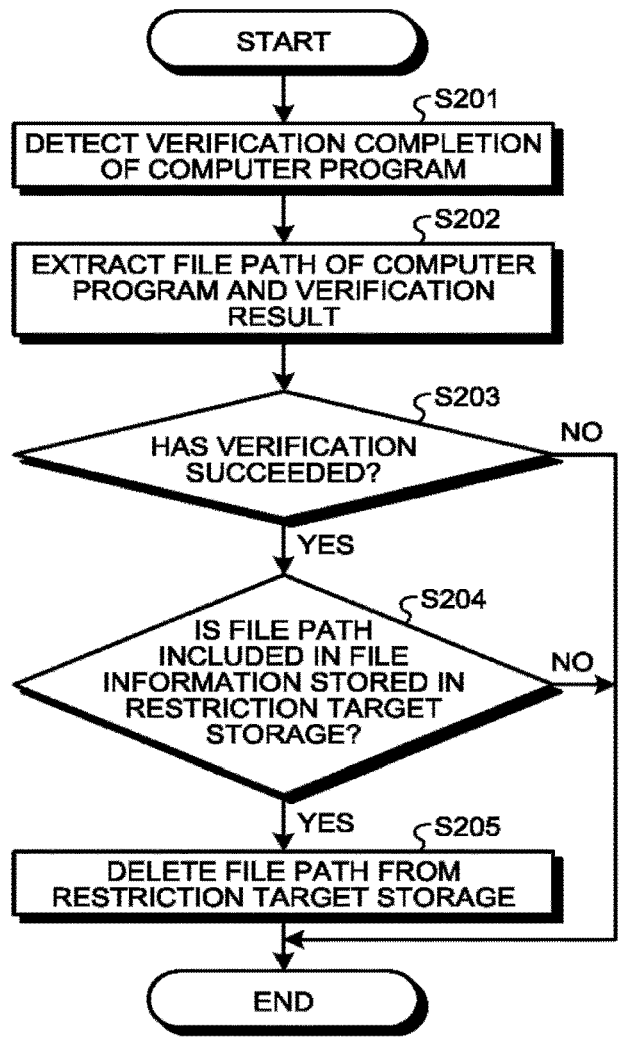
FIG. 5 is a flowchart for explaining an operation example of the information processing apparatus according to the second embodiment.

FIG. 5 is a flowchart for explaining an operation example of the information processing apparatus 10 of the second embodiment. The flowchart of FIG. 5 illustrates a processing procedure performed by the first update unit 16 every time the verification unit 15 verifies a computer program. The processing detection unit 13 and the first processing controller 14 perform processing in the same procedure as in the first embodiment (see FIG. 3), separately from the processing illustrated in the flowchart of FIG. 5.

Once the verification of a computer program by the verification unit 15 is completed, the first update unit 16 detects verification completion (Step S201), and extracts a file path of the computer program and a verification result (Step S202). Then, the first update unit 16 determines whether the verification of the computer program by the verification unit 15 has succeeded based on the extracted verification result (Step S203), and further determines, when the verification of the computer program has succeeded (Yes at Step S203), whether the extracted file path is included in the file information stored in the restriction target storage 12 (Step S204). Then, when the file path is included in the file information stored in the restriction target storage 12 (Yes at Step S204), the first update unit 16 deletes the file path from the restriction target storage 12 (Step S205). When the verification of the computer program by the verification unit 15 has failed (No at Step S203), or when the file path of the computer program of which the verification has succeeded is not stored in the restriction target storage 12 (No at Step S204), the processing finishes as it is.

Here, assuming that the file information exemplified in FIG. 2 is stored in the restriction target storage 12, there will be further described the operation of the information processing apparatus 10 of the second embodiment when the verification unit 15 has verified a computer program, while exemplifying a concrete example.

Figure 6:
FIG. 6 is a diagram illustrating an example of file information stored in the restriction target storage.

For example, it is assumed that the verification unit 15 verifies validity of the computer program "/usr/bin/sample", and the result is verification success indicating that the computer program "usr/bin/sample" is valid. Here, the first update unit 16 detects completion of verification of the computer program by the verification unit 15, and extracts the file path "/usr/bin/sample" of the computer program as a verification target and a verification result "verification success". Next, with verification success as a verification result, the first update unit 16 confirms whether the file path "/usr/bin/sample" is stored in the restriction target storage 12. Here, as illustrated in FIG. 2, the file path "/usr/bin/sample" is stored in the restriction target storage 12. Thus, the first update unit 16 deletes the file path "/usr/bin/sample" from the restriction target storage 12. As a result, the file information stored in the restriction target storage 12 is updated as illustrated in FIG. 6.

The above has been described assuming that the verification unit 15 verifies the validity of a computer program. However, also regarding various files other than computer programs, when the file information on a file determined to be valid by the verification unit 15 is included in the file information stored in the restriction target storage 12, the first update unit 16 deletes the file information on the file from the restriction target storage 12.

As described above with the concrete examples, the information processing apparatus 10 of the second embodiment deletes, when the file information on a file determined to be valid by the verification unit 15 is included in the file information stored in the restriction target storage 12, the file information from the restriction target storage 12. Therefore, in the information processing apparatus 10 of the second embodiment, it is possible to permit processing on the file written rightly while restricting processing on the file written invalidly, thus effectively preventing the inconvenience that the start of execution of the computer program updated rightly is restricted, for example.

Second Modification

The above has described the example in which the file information stored in the restriction target storage 12 is updated based on verification results by the verification unit 15. However, the file information stored in the restriction target storage 12 may be updated manually through a console, a web interface, or the like, for example.

Figure 7:
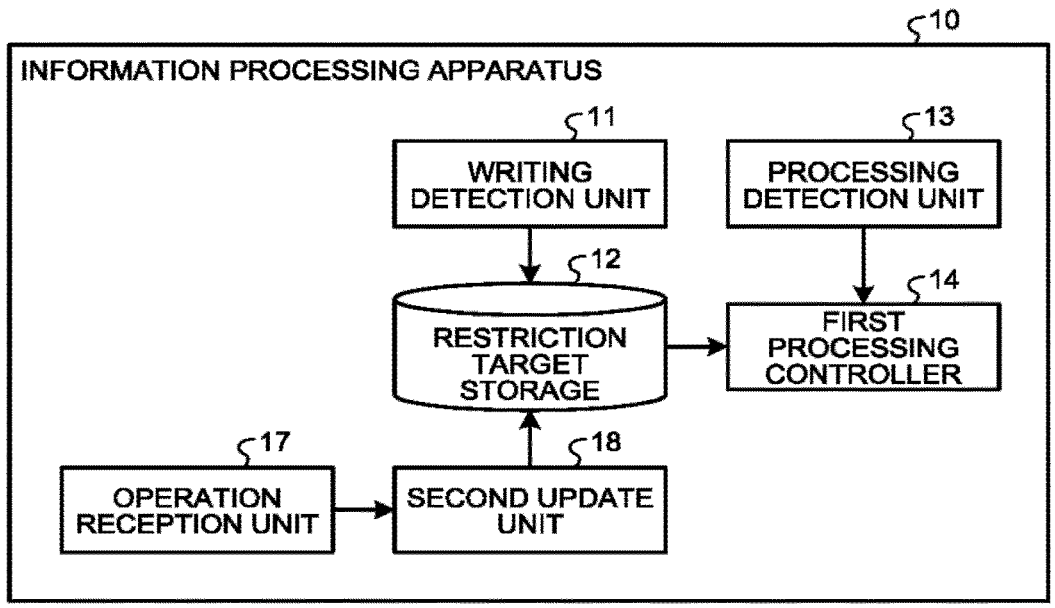
FIG. 7 is a block diagram illustrating a functional configuration example of an information processing apparatus according to a modification of the second embodiment.

FIG. 7 is a block diagram illustrating a functional configuration example of the information processing apparatus 10 according to the second modification. As illustrated in FIG. 7, the information processing apparatus 10 of the second modification includes an operation reception unit 17 and a second update unit 18 instead of the verification unit 15 and the first update unit 16, as compared with the configuration of the above-described second embodiment (see FIG. 4).

The operation reception unit 17 receives operation for specifying file information to be deleted. The operation here may be user's selection of file information to be deleted among a displayed list of the file information stored in the restriction target storage 12, or user's arbitrary specification of file information as a target to be deleted. Moreover, it is also possible to combine the above-described second embodiment and the second modification, so that a user is asked whether the file information on a file determined to be valid by the verification unit 15 is to be deleted, and when operation ordering deletion of the file information is made, the operation reception unit 17 receives it as operation specifying file information to be deleted.

When the file information specified by the operation received by the operation reception unit 17 is stored in the restriction target storage 12, the second update unit 18 deletes the file information from the restriction target storage 12. For example, when system update with a computer program change is performed, the file path of the computer program changed by system update is registered in the restriction target storage 12. In this case, when the operation reception unit 17 receives operation for specifying the file path of the changed computer program as a target to be deleted, the second update unit 18 deletes the file path of the changed computer program from the restriction target storage 12.

In the second modification, the restriction target storage 12 is updated by deleting file information from the restriction target storage 12 in accordance with user's operation. However, it is also possible to combine the second modification with the above-described second embodiment, so that the information processing apparatus 10 has both the function of updating the restriction target storage 12 in accordance with user's operation and the function of automatically updating the restriction target storage 12 in accordance with verification results by the verification unit 15. In this case, the information processing apparatus 10 includes the operation reception unit 17 and the second update unit 18 in addition to the components of the above-described second embodiment.

Third Embodiment

Next, the third embodiment will be described. The third embodiment is an example in which the restriction on processing based on file information stored in the restriction target storage 12 is associated with the restriction on processing based on verification results on files so as to achieve multiple protection.

Figure 8:
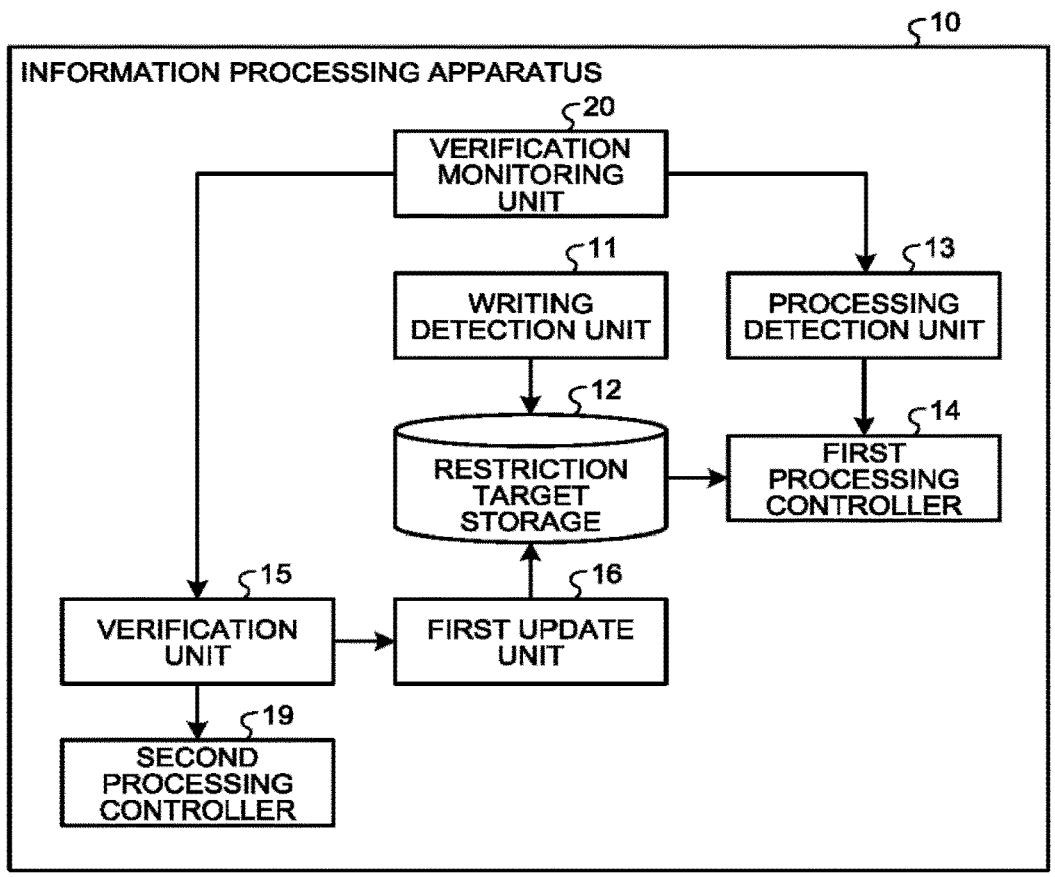
FIG. 8 is a block diagram illustrating a functional configuration example of an information processing apparatus according to a third embodiment.

FIG. 8 is a block diagram illustrating a functional configuration example of the information processing apparatus 10 according to the third embodiment. As illustrated in FIG. 8, the information processing apparatus 10 of the third embodiment further includes a second processing controller 19 and a verification monitoring unit 20, in addition to the components of the above-described second embodiment (see FIG. 4).

The second processing controller 19 restricts processing on a file determined to be invalid by verification by the verification unit 15. The restriction on processing by the second processing controller 19 is same as that by the first processing controller 14. That is, when the processing on a file is the start of execution of a computer program, the second processing controller 19 makes a control so that the execution of the computer program is not started.

The verification monitoring unit 20 monitors whether the verification unit 15 is operating normally, and controls the operation of the processing detection unit 13 and the first processing controller 14 depending on whether the verification unit 15 is operating normally. For example, the verification monitoring unit 20 regularly monitors whether the verification unit 15 is operating normally, and requests, when it is determined that the verification unit 15 is not operating normally, the processing detection unit 13 to start detection. Therefore, the processing detection unit 13 starts detection of file processing (request for starting processing on a file), and in accordance with this, the first processing controller 14 starts the operation thereof. In contrast, when it is determined that the verification unit 15 is operating normally, the verification monitoring unit 20 requests the processing detection unit 13 to stop detection. Thus, the processing detection unit 13 stops detection of file processing, and the first processing controller 14 also stops the operation thereof.

The method of monitoring whether the verification unit 15 is operating normally is not especially limited, and various methods can be used. For example, there may be used a method of confirming, with reference to a list of processes currently in operation, whether a process of the verification unit 15 is included in the list, or a method of determining, when a response to a given message transmitted to the verification unit 15 has been received, that the verification unit 15 is operating normally, for example.

Figure 9:
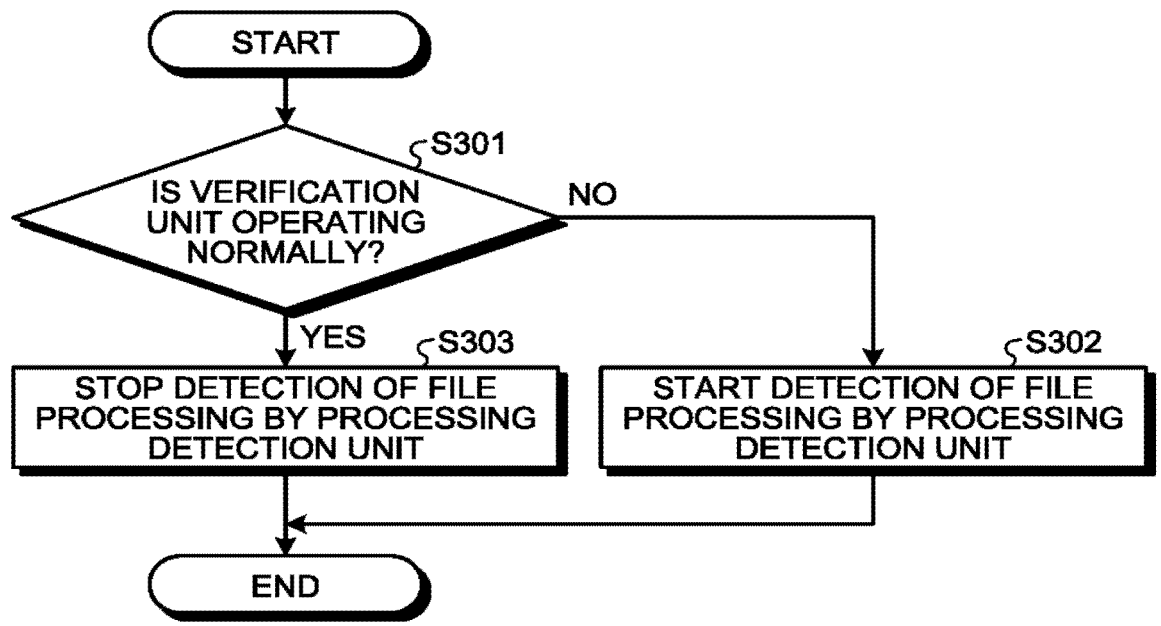
FIG. 9 is a flowchart for explaining an operation example of the information processing apparatus according to the third embodiment.

FIG. 9 is a flowchart for explaining an operation example of the information processing apparatus 10 of the third embodiment. The flowchart of FIG. 9 illustrates a processing procedure performed regularly by the verification monitoring unit 20. The processing detection unit 13 and the first processing controller 14 perform processing in the same procedure as the first embodiment (see FIG. 3) after the verification monitoring unit 20 requests the processing detection unit 13 to start detection.

The verification monitoring unit 20 checks whether the verification unit 15 is operating normally by regular monitoring (Step S301). Then, once it is determined that the verification unit 15 is not operating normally (No at Step 3301), the verification monitoring unit 20 requests the processing detection unit 13 to start detection, so that the processing detection unit 13 starts detection of file processing (Step S302). In contrast, once it is determined that the verification unit 15 is operating normally (Yes at Step S301), the verification monitoring unit 20 requests the processing detection unit 13 to stop detection, so that the processing detection unit 13 stops detection of file processing (Step S303).

As described above, the information processing apparatus 10 of the third embodiment monitors whether the verification unit 15 is operating normally, and performs, when the verification unit 15 is not operating normally, restriction on processing by the first processing controller 14, that is, restriction on processing based on file information stored in the restriction target storage 12. Therefore, in the third embodiment, it is possible to prevent performance degradation due to the same-time operation of the first processing controller 14 and the second processing controller 19. Moreover, as a method of enhance the safety of a computer system, there is a method called multiple protection. With a plurality of different processing controllers such as the first processing controller 14 and the second processing controller 19, as described in the third embodiment, even when one processing controller is attacked, the other processing controller can prevent this. That is, the configuration of the information processing apparatus 10 as in the third embodiment can further enhance the safety.

To keep the performance of the information processing apparatus 10, the verification monitoring unit 20 may request, when the verification unit 15 is not operating normally, the verification unit 15 to stop verification, so that the verification unit 15 stops file verification processing.

The above has described the first embodiment, the first modification, the second embodiment, the second modification, and the third embodiment. However, the above-described embodiments and modifications may be combined arbitrarily and implemented.

Supplemental Explanation

The information processing apparatus 10 of the above-described embodiments and modifications can be implemented by the cooperation of hardware forming a normal computer and a computer program (software) executed by a computer. The functions of the information processing apparatus 10 explained as the above-described embodiments and modifications can be implemented by a computer executing a computer program stored in advance as firmware in a nonvolatile memory such as a read only memory (ROM), for example.

Figure 10:
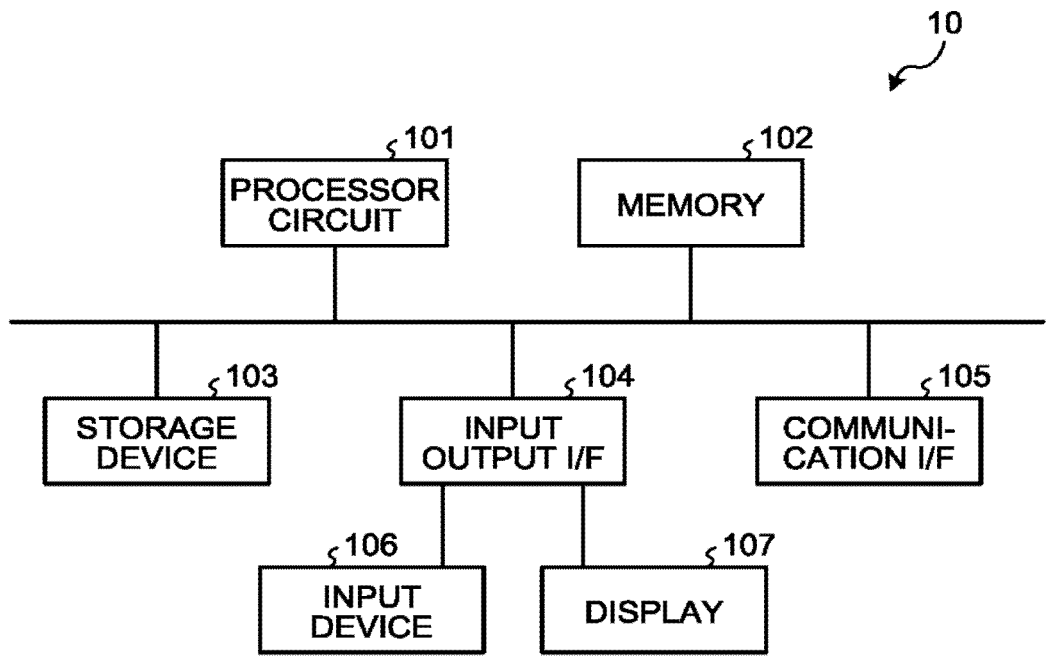
FIG. 10 is a block diagram illustrating a hardware configuration example of the information processing apparatus.

FIG. 10 is a block diagram illustrating a hardware configuration example of the information processing apparatus 10. As illustrated in FIG. 10, for example, the information processing apparatus 10 can adopt a hardware configuration as a normal computer (computer system) including a processor circuit 101 such as a central processing unit (CPU) and a graphics processing unit (GPU), a memory 102 such as a random access memory (RAM) and a ROM, a storage device 103 such as a hard disk drive (HDD) and a solid state drive (SDD), an input output interface (I/F) 104 for connecting peripherals such as an input device 106 and a display 107, and a communication I/F 105 for communication with external devices. Then, the processor circuit 101 executes a computer program of firmware using the memory 102, for example, whereby there are implemented the units of the information processing apparatus 10 of the above-described embodiments and modifications, such as the writing detection unit 11, the processing detection unit 13, the first processing controller 14, the verification unit 15, the first update unit 16, the operation reception unit 17, the second update unit 18, the second processing controller 19, and the verification monitoring unit 20. Moreover, the restriction target storage 12 can be implemented with a storage device 103, for example.

That is, the above-described units are stored in a ROM or the like as a computer program forming firmware and mounted on a computer, for example, and one or more processors of the computer loads the computer program from the ROM onto a RAM and executes it, whereby the above-described units can be generated on the RAM.

The computer programs for providing the units of the information processing apparatus 10 of the above-described embodiments and modifications may be stored in advance and provided in a nonvolatile memory such as a ROM, or may be stored on another computer connected to a network such as the Internet and provided by being downloaded through the network. The above-described computer programs may be also provided or distributed through a network such as the Internet. Moreover, the above-described computer programs may be stored and provided in a computer-readable storage medium.

A part or all of the units of the information processing apparatus 10 of the above-described embodiments and modifications may be implemented by dedicated hardware such as an application specific integrated circuit (ASIC) and a field-programmable gate array (FPGA).

The information processing apparatus 10 of the above-described embodiments and modifications may be made as a network system connecting a plurality of computers to be communicable, and the above-described units may be distributed to the computers to implement the information processing apparatus 10. The information processing apparatus 10 of the above-describe embodiments and modifications may be a virtual machine operating on a cloud system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
processing circuitry configured to:
detect writing on a first file that is a target on which processing is restricted and register, in restriction target storage, file information on the first file;
perform, when processing on a second file is requested and file information on the second file coincides with the file information stored in the restriction target storage, a first restriction to restrict the processing of the second file;

verify whether a third file is a rightly written file;
when the third file is determined to be the rightly written file by the verification and file information on the third file is stored in the restriction target storage, delete the file information on the third file from the restriction target storage; and
when the third file is determined to not be the rightly written file by the verification, perform a second restriction to restrict processing on the third file determined to not be the rightly written file, wherein
the processing circuitry is further configured to:
monitor whether the verification is performed normally;
start, when it is determined that the verification is not performed normally, the detecting and the performing of the first restriction; and
stop, when it is determined that the verification is performed normally, the detecting and the performing of the first restriction.

2. An information processing method performed by an information processing apparatus, the method comprising:
detecting writing on a first file that is a target on which processing is restricted and registering, in restriction target storage, file information on the first file;
performing, when processing on a second file is requested and file information on the second file coincides with the file information stored in the restriction get storage, a first restriction to restrict the processing on the second file;
verifying whether a third file is a rightly written file;
when the third file is determined to be the rightly written file by the verifying and file information on the third file is stored in the restriction target storage, deleting the file information on the third file from the restriction target storage, and
when the third file is determined to not be the rightly written file by the verifying, performing a second restriction to restrict processing on the third file determined to not be the rightly written file, wherein
the method further comprises:
monitoring whether the verification is performed normally;
starting when it is determined that the verification is not performed normally, the detecting and the performing of the first restriction; and
stopping, when it is determined that the verification is performed normally, the detecting and the performing of the first restriction.

3. A computer program product comprising a non-transitory computer readable medium including programmed instructions, wherein the instructions, when executed by a computer, cause the computer to perform:
detecting writing on a first file that is a target on which processing is restricted and registering, in restriction target storage, file information on the first file;
performing, when processing on a second file is requested and file information on the second file coincides with the file information stored in the restriction target storage, a first restriction to restrict the processing on the second file;
verifying whether a third file is a rightly written file;
when the third file is determined to be the rightly written file by the verifying and file information on the third file is stored in the restriction target storage, deleting the file information on the third file from the restriction target storage, and
when the third file is determined to not be the rightly written file by the verifying, performing a second restriction to restrict processing on the third file determined to not be the rightly written file, wherein
the instructions further cause the computer to perform:
monitoring whether the verification is performed normally;
starting, when it is determined that the verification is not performed normally, the detecting and the performing of the first restriction; and
stopping, when it is determined that the verification is performed normally, the detecting and the performing of the first restriction.

* * * * *